United States Patent [19]
Thomas et al.

[11] Patent Number: 5,906,459
[45] Date of Patent: May 25, 1999

[54] LASER-ASSISTED MILLING PROCESS

[75] Inventors: Thierry Thomas, Chelles; Joël Olivier Vigneau, Champcueil, both of France

[73] Assignees: Societe Nationale d'Etude Et de Construction de Moteurs d'Aviation "Snecma"; Etat Francais, both of Paris, France

[21] Appl. No.: 08/873,082

[22] Filed: Jun. 11, 1997

[30] Foreign Application Priority Data

Jun. 20, 1996 [FR] France .................................. 96 07665

[51] Int. Cl.⁶ ..................................................... B23C 9/00
[52] U.S. Cl. ................. 409/132; 219/121.6; 219/121.65; 219/121.85; 409/135
[58] Field of Search ......................... 219/121.65, 121.66, 219/121.85, 121.6; 408/19; 409/132, 135, 136, 139

[56] References Cited

U.S. PATENT DOCUMENTS

| | | | |
|---|---|---|---|
| Re. 25,105 | 12/1961 | Cargill | 219/602 |
| 2,600,453 | 6/1952 | Weingart | 219/602 |
| 2,654,821 | 10/1953 | Gillett | 219/69.17 |
| 4,229,640 | 10/1980 | Castellani Longo | 219/121.6 |
| 4,733,049 | 3/1988 | Lemelson | 219/121.65 |
| 5,478,983 | 12/1995 | Rancourt | 219/121.63 |
| 5,566,437 | 10/1996 | Jaeggi | 409/139 |

FOREIGN PATENT DOCUMENTS

| | | |
|---|---|---|
| 61-152345 | 7/1986 | Japan . |
| 579076 | 7/1946 | United Kingdom . |

OTHER PUBLICATIONS

V. Weck, et al., "Laserintegration in Werkzeugmaschinen", VDI–Zeitschrift, vol. 135, No. 5, May 1993, pp. 38–41.

*Primary Examiner*—Andrea L. Pitts
*Assistant Examiner*—Christopher Kirkman
*Attorney, Agent, or Firm*—Oblon, Spivak, McClelland, Maier & Neustadt, P.C.

[57] ABSTRACT

In a laser-assisted milling process at least one laser beam is directed onto the workpiece immediately upstream of the milling tool so as to heat at least one zone of the workpiece parallel to the cutting profile produced by the milling tool, and the laser beam is moved longitudinally over the workpiece in the same direction and at the rate of advance as the milling tool is moved longitudinally over the workpiece. The heated zone may be disposed immediately upstream of either or both of the points at which the cutting edge of the tool enters and exits the cutting zone of the workpiece, or it may be a zone parallel to the cutting profile and of a width equal to that of the cutting zone.

5 Claims, 1 Drawing Sheet

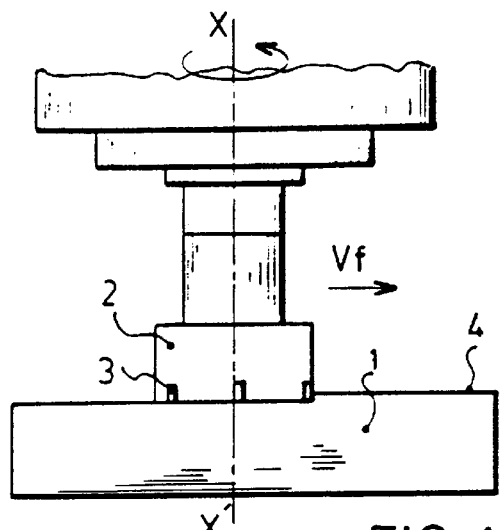
FIG:1
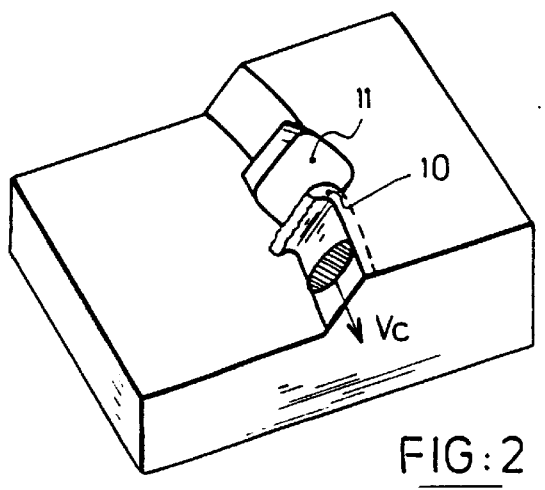
FIG:2
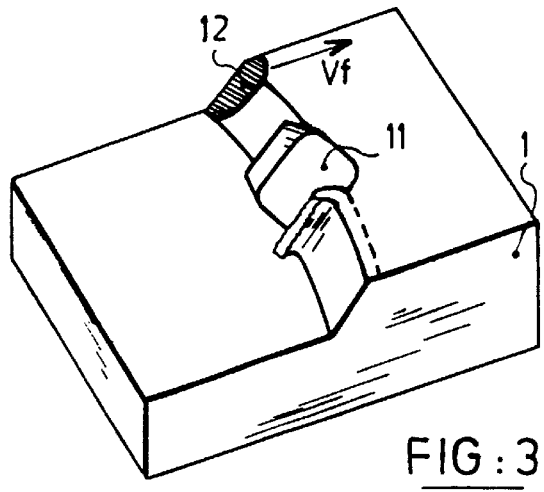
FIG:3
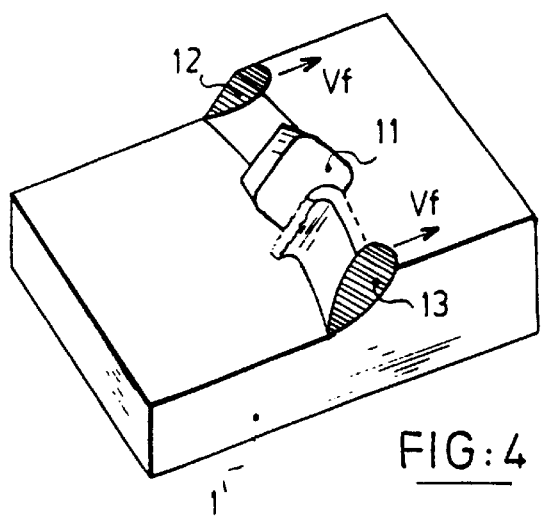
FIG:4
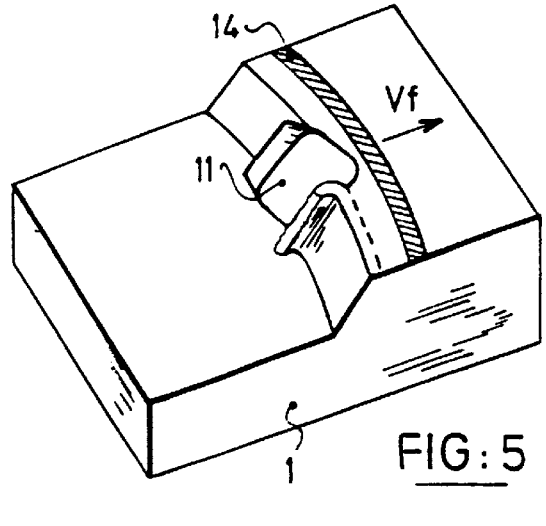
FIG:5

LASER-ASSISTED MILLING PROCESS

BACKGROUND OF THE INVENTION

1. Field of the Invention

The invention relates to a laser-assisted milling process for machining high mechanical strength materials such as, for example, certain steels, titanium alloys, superalloys, and ceramics.

2. Summary of the Prior Art

Laser-assisted machining involves using a laser to heat a workpiece during machining so as to produce a temperature in the cutting zone sufficient to reduce the mechanical properties of the material of the workplace in the cutting zone and thereby facilitate the machining operation.

It is known to use laser assistance in turning operations on a lathe. In turning operations the workpieces are articles of revolution which are rotated, and the cutting tool comprises a single cutting plate which machines the workpiece continuously as the workpiece rotates. The laser is connected to the tool support so that the laser beam moves simultaneously with the cutting tool. The point where the laser beam impinges on the workpiece is therefore always in the same position relative to the cutting plate, and moves over the workpiece at the same speed and in the same direction as the cutting speed. The point of impingement of the laser beam is usually located on the chamfered edge of the cutting zone and disposed immediately in front of the cutting tool.

However, laser assistance is difficult when it is required to machine parallelepipedic workpieces by milling, because the milling tool usually comprises a number of cutting plates which operate on the workpiece in succession as the milling tool rotates. Machining is thus intermittent and it is difficult to heat the workpiece at the chamfered edge of the cutting zone immediately in front of each cutting plate. For such heating it is necessary to use a number of laser beams associated one with each of the cutting plates. Also, depending upon the geometry of the milling tool the dwell time of each laser beam may be too short.

SUMMARY OF THE INVENTION

It is an object of the invention to overcome this problem and to provide a laser-assisted milling process which is simple to operate and which is effective in reducing the mechanical strength of the material of the workpiece in the cutting zone.

Accordingly, the invention provides a laser-assisted milling process for machining a plane surface on a workpiece, comprising the steps of:

(a) bringing a milling tool having at least one cutting edge into contact with said workpiece whereby the rotation of said milling tool brings said at least one cutting edge into engagement with a cutting zone of said workpiece having an entry point and an exit point;

(b) moving said milling tool over said workplace at a predetermined rate of advance in a longitudinal direction parallel to the plane surface machined by said milling tool;

(c) directing at least one laser beam onto said workpiece immediately upstream of said milling tool in said longitudinal direction during the milling operation so as to heat at least one zone of the workpiece parallel to a predetermined cutting profile; and, (d) moving said at least one laser beam longitudinally over said workpiece in the same longitudinal direction and at the same rate of advance as said milling tool is moved over said workpiece.

In a first embodiment of the invention, the zone heated by the laser beam is a critical zone disposed immediately upstream of the point at which the cutting edge of the tool enters the cutting zone of the workpiece.

In a second embodiment of the invention, the zone heated by the laser beam is a critical zone disposed immediately upstream of the point at which the cutting edge exits the cutting zone of the workpiece.

In a third embodiment of the invention, the workpiece is heated by laser in two critical zones disposed one immediately upstream of the entry point of the cutting edge into the cutting zone of the workpiece and the other immediately upstream of the exit point of the cutting edge from the cutting zone.

In a fourth embodiment of the invention, the workpiece is heated by the laser immediately upstream of the milling tool in a zone across the whole of the workpiece parallel to the predetermined cutting profile.

Other preferred features and advantages of the invention will become apparent from the following nonlimitative description of the preferred embodiments with reference to the accompanying drawings.

BRIEF DESCRIPTION OF THE DRAWINGS

FIG. 1 is a simplified diagram illustrating the machining of a parallelepipedic workpiece by milling;

FIG. 2 shows a diagram of a workpiece during a laser-assisted milling process wherein a laser beam is directed to heat the chamfered edge of the cutting zone in front of the cutting edge;

FIG. 3 shows a diagram similar to FIG. 2 but indicating where the workpiece is heated by laser during a first embodiment of the laser-assisted milling process of the invention;

FIG. 4 shows a diagram similar to FIG. 3 but indicating where the workpiece is heated by laser in a second embodiment of the laser-assisted milling process of the invention; and, FIG. 5 shows a diagram similar to FIGS. 3 and 4, but indicating where the workpiece is heated by laser during a third embodiment of the laser-assisted milling process of the invention.

DESCRIPTION OF THE PREFERRED EMBODIMENTS

The diagram of FIG. 1 illustrates the machining of a parallelepipedic workpiece 1 by means of a milling tool 2, the tool 2 being rotated around an axis XX' perpendicular to the workpiece surface 4 during the milling operation. The milling tool 2 has a number of cutting plates 3 whose cutting edges make contact with the workpiece in succession as the tool rotates around its axis XX'. Machining is therefore intermittent and is effected consecutively by the cutting edges of the milling tool. To machine the entire surface 4 of the workpiece 1, the tool is moved over the surface 4 longitudinally (as indicated by the arrow) and parallel to the surface being machined at a predetermined rate of advance Vf.

FIG. 2 shows an example of how a workpiece may be heated by a laser during milling. As indicated, the laser beam is directed towards the chamfered edge of the cutting zone 10 to heat a zone immediately in front of the cutting edge 11, and is moved to advance the heating zone at the same speed Vc and in the same direction as the cutting edge 11. It is difficult to carry out this manner of heating since it requires a number of laser beams associated one with each of the cutting edges. Also, each laser beam must move at high speed equal to the rotational speed of the milling tool so as always to be located in the same way relative to the respective cutting edge.

FIGS. 3, 4 and 5 show how the workpiece is heated in three different embodiments of the laser-assisted milling process in accordance with the invention.

The heating in the embodiment shown in FIG. 3 is effected by directing a laser beam towards the workpiece immediately upstream of the milling tool so as to heat only a critical zone 12 disposed immediately upstream of the point at which a cutting edge 11 of the tool enters the cutting zone of the workpiece.

The entry point of the cutting edge into the workpiece being machined is a critical zone because of the mechanical shock experienced by both components. In particular, this mechanical shock causes the tool to wear very rapidly. If the critical zone is heated the mechanical properties of the material of the workpiece are reduced in this zone, thus making it easier to machine the workpiece and causing less wear of the cutting edges.

The laser beam is moved longitudinally over the workpiece in the same direction and at the same rate of advance Vf as the longitudinal rate of advance of the cutting tool. Since the latter rate is considerably less, usually by a factor of about 100, than the speed of rotation of the tool the dwell time of the laser beam on the heating zone is much longer than in the process shown in FIG. 2, with the result that the power of the laser beam can be reduced and the machining conditions of the workpiece improved. Also, this manner of heating is easier to carry out since it requires only one laser beam.

The laser heating in the embodiment shown in FIG. 4 is effected in two critical zones 12, 13, respectively disposed immediately upstream of the points where a cutting edge of the cutting tool enters and exits the cutting zone of the workpiece. The exit point of the cutting edge from the workpiece is a second critical zone because the tool is subjected to severe mechanical stresses in this region also. These stresses tend to chip the cutting edges and burr the workpiece.

The heating of this second critical zone 13 as well as the first critical zone 12 further facilitates and improves the machining of the workpiece.

This embodiment requires the use of two laser beams directed one towards the first critical zone 12 and the other towards the second critical zone 13. The two laser beams are moved longitudinally over the workpiece in the same direction and at the same speed Vf as the longitudinal rate of advance of the milling tool.

In another embodiment (not shown) only the second critical zone 13 disposed upstream of the exit point of the cutting edge from the workpiece is heated. In this case, only one laser beam is required and is moved in the manner described with reference to FIG. 4.

The laser heating in the embodiment shown in FIG. 5 is effected immediately upstream of the milling tool in a zone 14 parallel to the cutting profile and of a width equal to the width of the cutting zone. This embodiment requires the use of a single laser beam of greater power than is required for the embodiments described with reference to FIGS. 3 and 4. This laser beam is moved longitudinally over the workpiece in the same direction and at the same speed Vf as the longitudinal rate of advance of the milling tool.

Different heating arrangements will be preferred according to the shape of the workpiece to be machined in order, for example, to facilitate implementation or to limit the power required for the laser beam. When the workpiece is to be machined over a small height it may be advantageous to heat the workpiece in a zone of a width equal to the width of the cutting zone as shown in FIG. 5. On the other hand, if the workpiece is to be machined over a greater height it is preferable to heat the workpiece only in the first critical zone 12 disposed upstream of the point where the cutting edge enters the workpiece.

We claim:

1. A laser-assisted milling process for machining a plane surface on a workpiece comprising the steps of:

(a) bringing a milling tool having at least one cutting edge into contact with said workpiece whereby a rotation of said milling tool brings said at least one cutting edge into engagement with a cutting zone of said workpiece having an entry point and an exit point;

(b) moving said milling tool over said workpiece at a predetermined rate of advance in a longitudinal direction parallel to a plane surface machined by said milling tool and perpendicular to said cutting zone;

(c) directing at least one laser beam onto said workpiece immediately upstream of said milling tool in said longitudinal direction during a milling operation so as to heat at least one zone of the workpiece parallel to a predetermined cutting profile; and, (d) moving said at least one laser beam longitudinally over said workpiece in said longitudinal direction, at said predetermined rate of advance of said milling tool and perpendicular to said cutting zone.

2. The laser-assisted milling process according to claim 1, wherein said workpiece is heated by said at least one laser beam in a critical zone disposed immediately upstream of said entry point of said at least one cutting edge into said cutting zone of said workpiece.

3. The laser-assisted milling process according to claim 1, wherein said workpiece is heated by said at least one laser beam in a critical zone disposed immediately upstream of said exit point of said at least one cutting edge from said cutting zone of said workpiece.

4. The laser-assisted milling process according to claim 1, wherein said workpiece is heated by said at least one laser beam in first and second critical zones, the first critical zone disposed immediately upstream of said entry point of said at least one cutting edge into said cutting zone of said workpiece, and the second critical zone disposed immediately upstream of said exit point of said at least one cutting edge from said cutting zone.

5. The laser-assisted milling process according to claim 1, wherein said workpiece is heated by said at least one laser beam immediately upstream of said milling tool in a zone parallel to said predetermined cutting profile and at a width equal to a width of said cutting zone.

* * * * *